United States Patent
Johansson et al.

(10) Patent No.: US 9,432,356 B1
(45) Date of Patent: Aug. 30, 2016

(54) HOST IDENTITY BOOTSTRAPPING

(75) Inventors: Jesper M. Johansson, Woodinville, WA (US); Matthew T. Corddry, Seattle, WA (US); Tom F. Hansen, Kirkland, WA (US); Luke F. Kearney, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 1435 days.

(21) Appl. No.: 12/435,995

(22) Filed: May 5, 2009

(51) Int. Cl.
*H04L 29/06* (2006.01)
*G06F 21/33* (2013.01)

(52) U.S. Cl.
CPC .......... *H04L 63/0823* (2013.01); *G06F 21/33* (2013.01); *H04L 29/06* (2013.01)

(58) Field of Classification Search
CPC .... H04L 63/0823; H04L 29/06; G06F 21/33
USPC ........................................................ 713/156
See application file for complete search history.

(56) References Cited

U.S. PATENT DOCUMENTS

| | | | | |
|---|---|---|---|---|
| 7,484,089 B1* | 1/2009 | Kogen et al. | ................ | 713/156 |
| 7,861,088 B1* | 12/2010 | Brothers | ...................... | 713/178 |
| 8,090,939 B2* | 1/2012 | Ali et al. | ...................... | 713/156 |
| 2003/0037234 A1* | 2/2003 | Fu et al. | ....................... | 713/158 |
| 2004/0268142 A1* | 12/2004 | Karjala et al. | ............... | 713/200 |
| 2005/0071677 A1* | 3/2005 | Khanna et al. | .............. | 713/201 |
| 2005/0076203 A1* | 4/2005 | Thornton et al. | ............ | 713/156 |
| 2005/0138360 A1* | 6/2005 | Kamalakantha | .............. | 713/156 |
| 2005/0154879 A1* | 7/2005 | Engberg et al. | ............. | 713/157 |
| 2006/0236096 A1* | 10/2006 | Pelton et al. | .................. | 713/155 |
| 2007/0088947 A1* | 4/2007 | Cross et al. | .................. | 713/165 |
| 2008/0046708 A1* | 2/2008 | Fitzgerald et al. | .............. | 713/2 |
| 2008/0209207 A1* | 8/2008 | Parupudi et al. | ............ | 713/156 |
| 2008/0294894 A1* | 11/2008 | Dubhashi et al. | ............ | 713/168 |
| 2008/0313712 A1* | 12/2008 | Ellison et al. | .................... | 726/4 |
| 2009/0222902 A1* | 9/2009 | Bender et al. | ................... | 726/10 |
| 2010/0138907 A1* | 6/2010 | Grajek et al. | .................. | 726/10 |
| 2011/0010548 A1* | 1/2011 | Stewart et al. | .............. | 713/170 |

OTHER PUBLICATIONS

Vishwa Prasad, Sreen Potakamuri, and Michael Ahern, "Scalable Policy Drive and General Purpose Public Key Infrastructure (PKI)", Dec. 2000 IEEEE, pp. 138-147.*
Trieu C. Chieu et al. "Dynamic Scaling of Web Applications in a Virtualized Cloud Computing Environment," 2009 IEEE International Conference on e-Business Engineering, pp. 281-286.*
Serdar Cabuk et al. "Towards Automated Provisioning of Secure Virtualized Networks," ACM Oct. 29-Nov. 2, 2007, pp. 235-245.*

* cited by examiner

*Primary Examiner* — Luu Pham
*Assistant Examiner* — Canh Le
(74) *Attorney, Agent, or Firm* — Davis Wright Tremaine LLP

(57) ABSTRACT

Automated provisioning of hosts on a network with reasonable levels of security is described in this application. A certificate management service (CMS) on a host, one or more trusted agents, and a public key infrastructure are utilized in a secure framework to establish host identity. Once host identity is established, signed encryption certificates may be exchanged and secure communication may take place.

21 Claims, 19 Drawing Sheets

HOST IDENTITY BOOTSTRAPPING

BACKGROUND

Provisioning is the installation and configuration of an end entity on a network. This end entity, or "host," may be a router, network attached storage, physical server, virtual server, etc. Traditionally, provisioning involves human interaction to establish the identity of the device. This establishment of host identity allows other security processes to reliably know who the host is, in order to ensure that only those hosts that are authorized to run a particular service do so.

Various schemes have been put forth to streamline and automate provisioning. However, these provisioning techniques rely upon a human actor to complete the provisioning process by participating in the establishment of the host identity. Virtual servers provide multiple separate server instances executing on common physical host, with each instance requiring separate provisioning. With the increasing population of servers, both physical and virtual, the problem becomes more challenging.

In large data center environments, this requirement for human interaction can lead to delays in provisioning as well as increased operational costs. Thus, there is a need for reasonably secure automated identification of hosts prior to their being turned over to production in order to permit fully automated provisioning of hosts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As described above, provisioning of hosts, including servers, in a data center has traditionally involved human interaction. Currently available solutions still ground the root of trust of a host's identity in a human that authorized the provisioning of a newly installed host and, thus, are not completely automated. Other available solutions rely on placement within a network to establish identity, a reliance which breaks down in large data center environments.

This disclosure describes techniques for automating the provisioning process. Using techniques described herein, host identity may be established to a network without human intervention, even before an operating system (OS) is fully instantiated on the host being provisioned. Once the host OS boots, a certificate management service loads and automatically retrieves one or more encryption certificates (certificates) from a certificate authority (CA). In one example, this certificate retrieval may utilize hypertext transport protocol secure (HTTPS). The certificates allow future secure communications between the host and the network. Certificates may also be renewed for a provisioned host without human intervention. Exceptional circumstances such as a change in the hardware may cause a change in the hardware identification (HWID) of the requesting host. This would make it a new host and require a new certificate.

The value of encryption certificates in the context of this application is not in the mere possession by a host of the encryption certificate. Possession only proves that a host has a certificate issued by an appropriate certificate authority. Rather, the value of the certificate is in the permissions granted to the identity authenticated by possession of the certificate, such as the host/hostclass mapping. So, while a rogue host may obtain a certificate, only legitimate hosts can take actions of value such as obtaining the software necessary to be a member of a hostclass. A host class is a grouping of hosts, and may be maintained by a trusted centralized authority. Thus, the issuance of a certificate is not necessarily a sensitive operation, but rather provisioning a host into a hostclass or otherwise trusting a host that has proven its identity, is a sensitive operation. The establishment of identity during the provisioning process is discussed in more detail next.

Illustrative Host Identity Bootstrapping Environment

Figure 1:
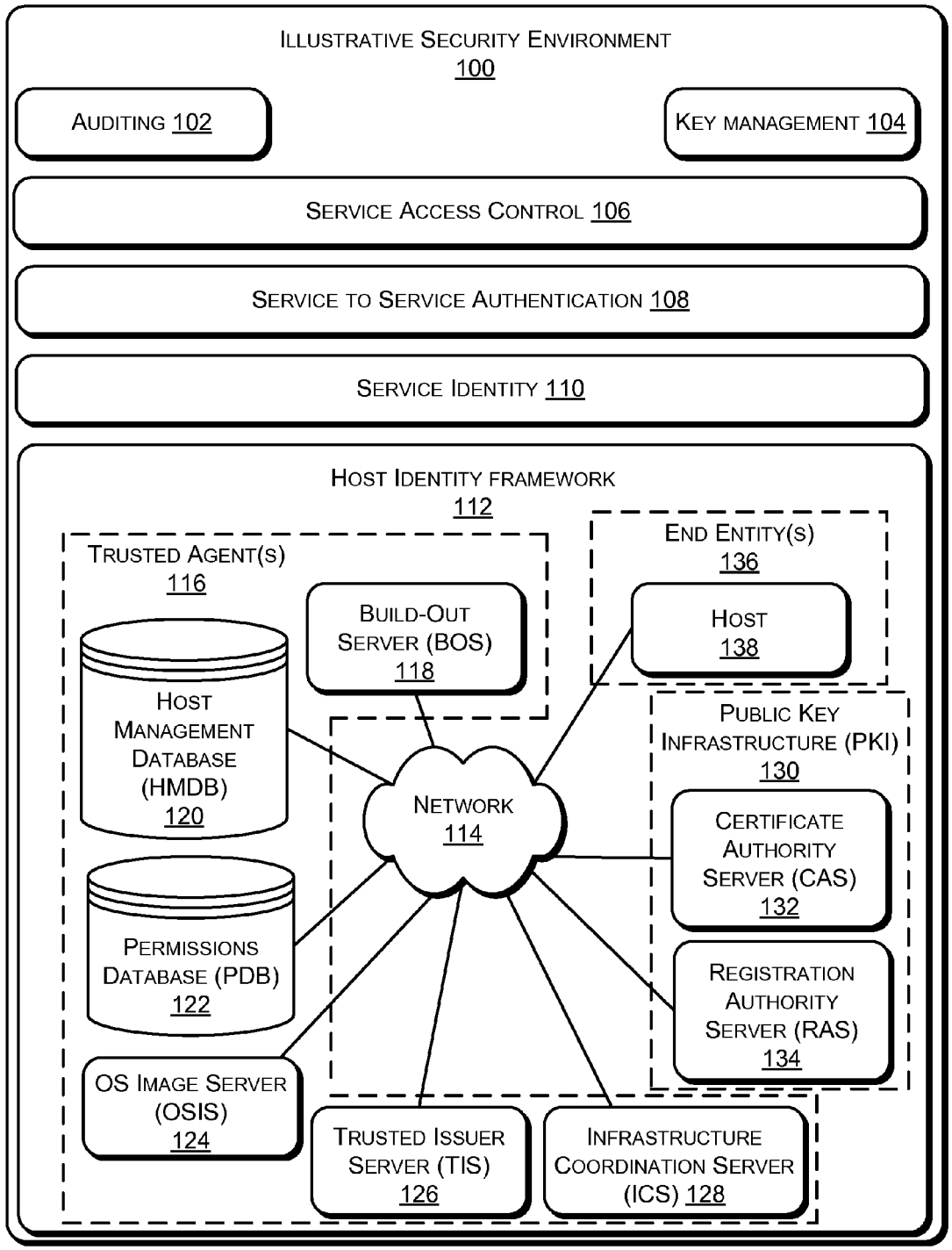
FIG. 1 is a block diagram of an illustrative security environment incorporating host identity bootstrapping.

FIG. 1 is a block diagram of an illustrative security environment 100 incorporating host identity bootstrapping. In this environment, the host identity is assigned in a secure fashion even prior to full instantiation of an OS, and effectively bootstraps its identity without manual intervention.

Security services used to provide secure web services include authentication, access control, and auditing. Auditing 102 requires, among other things, authentication to establish the actor attempting access and service access controls to determine what the actor did. This authentication may rely on some form of key management 104. Service access control 106 in turn depends upon binding an authenticated identity with a resource. Service-to-service authentication 108 further requires an authenticated identity. The authenticated service identity depends on there being a service identity 110 in the first place.

However, the service identity 110 is only as trustworthy as the manner in which that service was imbued with its identity. If a service is provisioned with its proof of identity after someone who could be untrusted has touched it, the identity may be untrustworthy. Thus, some sort of host identity framework 112 is called for.

Within host identity framework 112, a network 114 provides communication between devices which are attached to it. Network 114 may comprise an Ethernet, Wi-Fi, Token Ring, Fibre Channel, or other network including hardware and/or software configured to permit communication between devices. For illustration only, and not by way of limitation, the network in this application is described in the context of an Ethernet network using the internet protocol suite Transmission Control Protocol (TCP) and Internet Protocol (IP).

Trusted agent(s) 116 attached to network 114 may include several entities. These trusted agent(s) 116 may include a build-out server (BOS) 118 which provides build-out information to a host and updates a host management database (HMDB) 120 to reflect the host status and hardware identification (HWID) of the new host. HMDB 120 provides storage and retrieval of host information such as host status and HWID values. Each HWID is associated with a particular instantiation of an operating system, and not necessarily the specific underlying hardware in which the OS is running. For example, each instantiation of an operating system on each virtual server on a common physical server would have a different HWID.

A permissions database (PDB) 122 provides a permissions service which maintains a database of network resources accessible to specific encryption certificates.

An OS image server (OSIS) 124 provides operating system images for installation on a host 138.

A trusted issuer server (TIS) 126 provides a certificate signing request (CSR) request processing service, and responds to valid requests for CSRs from hosts with a CSR.

An infrastructure coordination server (ICS) 128 provides a management interface and facilitates communication between the hosts, public key infrastructure, and trusted agent(s) 116. The ICS 128 also provides a level of abstraction, allowing interaction and management between different security domains. For example, an ICS would allow a host in a "production" security domain to interact with servers in an "experimental" security domain.

A public key infrastructure (PKI) 130 is also included in the host identity framework 112. PKI 130 may include a Certificate Authority Server (CAS) 132 and Registration Authority Server (RAS) 134. CAS 132 signs encryption certificates, while RAS 134 may act as a proxy for the CAS 134. In other implementations, portions of PKI 130 may be operated by a same or different entity as an end entity 136 and/or trusted agents 116.

End entities 136 are also included in the host identity framework 112. These end entities may include servers, routers, storage devices, virtualized instances, or other unique computing resource that needs an identification certificate. Host 138 may be such an end entity 136 that is, or needs to be, authenticated to the network 114.

While shown as discrete devices, the servers and databases shown in FIG. 1 may be consolidated or distributed across several physical or virtual devices. For example, in one implementation TIS 126 and host 138 may be deployed as virtualized instances across a shared physical host. In such an implementation, a high degree of trust may be assumed for communication via a trusted control channel between these virtualized servers on shared computing hardware. This control channel may include a virtual networking connection between the virtualized servers, shared memory such as a common disk or memory location, and so forth. Thus, use of virtualized servers on shared computing hardware may result in increased security resulting from a greater level of trust for data exchanged between server instances via the control channel.

Figure 2:
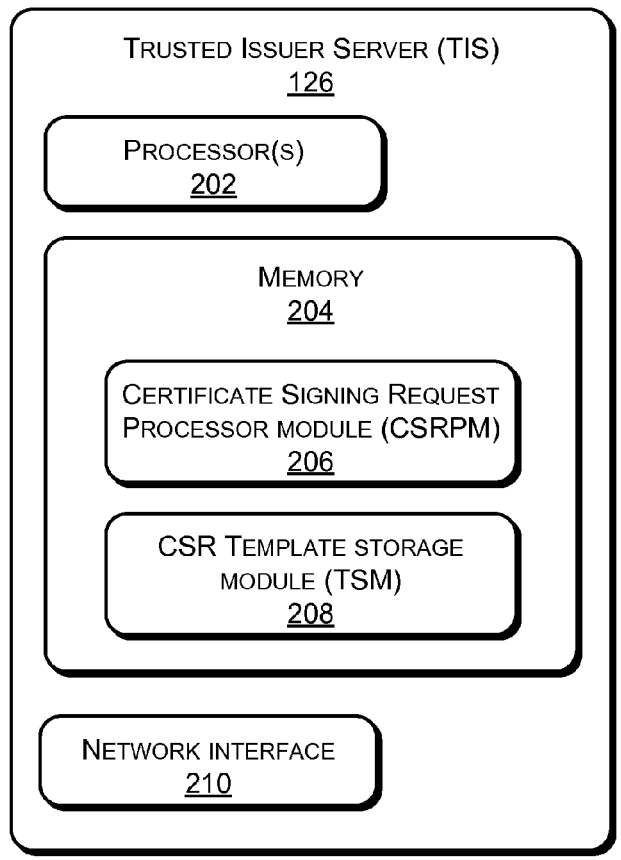
FIG. 2 is a schematic of an illustrative trusted issuer server (TIS) from FIG. 1.

FIG. 2 is a schematic 200 of the illustrative trusted issuer server (TIS) 126 from FIG. 1. TIS 126 comprises one or more processors 202 and a memory 204 coupled to the processor(s) 202. Stored within memory 204 may be a CSR Processor Module (CSRPM) 206. The CSRPM 206 responds to CSR requests and provides a host 138 with a CSR. The CSRPM 206 may determine which hostclass to put the host 138 into, and may retrieve a CSR template out of a CSR Template Storage Module (TSM) 208 to build the CSR for the host 138. A network interface 210 of the TIS 126 is also coupled to the processor 202 and to the network 114.

Figure 3:
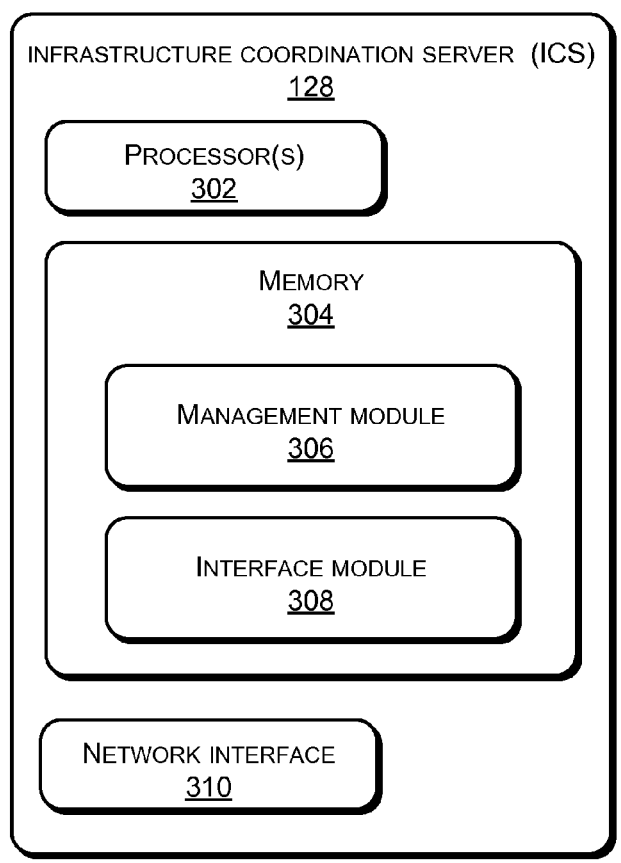
FIG. 3 is a schematic of an illustrative infrastructure coordination server (ICS) from FIG. 1.

FIG. 3 is a schematic 300 of an illustrative infrastructure coordination server (ICS) from FIG. 1. ICS 128 comprises one or more processors 302 and a memory 304 coupled to the processor(s) 302. Stored within memory 304 may be a management module 306. The management module 306 responds to host management and provisioning calls. Also within memory 304 may be interface module 308, which may be configured to act as an interface between trusted agents 116, PKI 130, and end entities 136. A network interface 310 of the ICS 128 is also coupled to the processor 302 and to the network 114.

Figure 4:
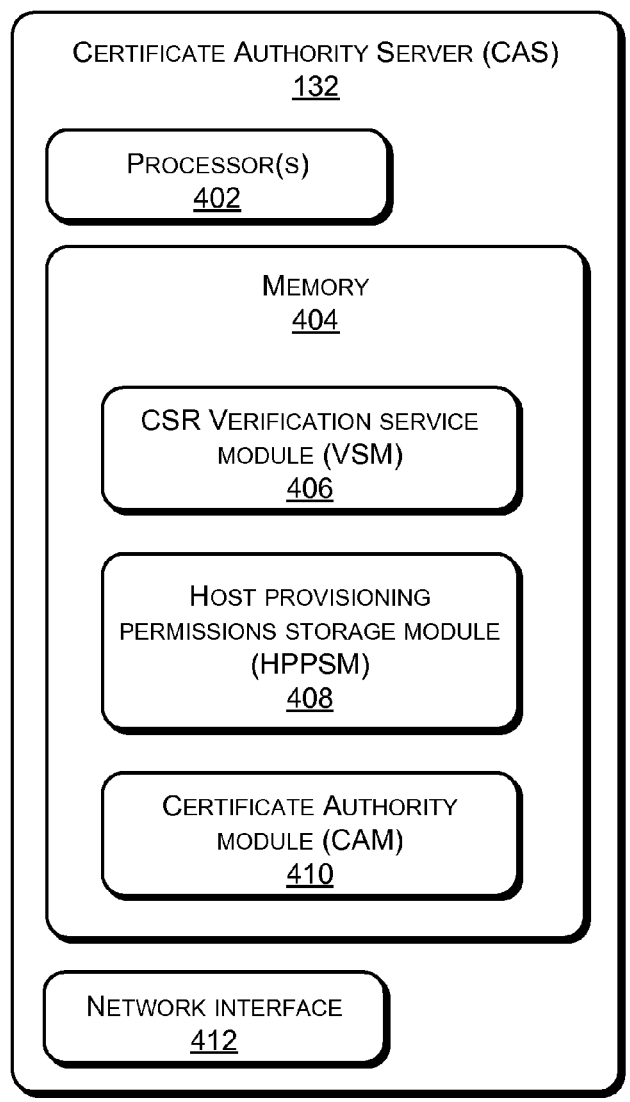
FIG. 4 is a schematic of an illustrative certificate authority server (CAS) from FIG. 1.

FIG. 4 is a schematic 400 of an illustrative embodiment of the certificate authority server (CAS) 132 from FIG. 1. CAS 132 comprises one or more processors 402 and a memory 404 coupled to the processor(s) 402. Stored in memory 404 may be a CSR Verification Service Module (VSM) 406. The VSM 406 responds to CSRs and provides a host 138 with an encryption certificate. Also within memory 404 is a Host Provisioning Permissions Storage Module (HPPSM) 408 and a Certificate Authority Module (CAM) 410. The HPPSM 408 is configured to provide information indicating that a BOS has authority to issue a CSR for the requested hostclass. The CAM 410 is configured to accept a verified CSR from the VSM 406 and to return a signed encryption certificate, which is forwarded on to the host 138. In some implementations, this acceptance and return may utilize HTTPS. In other implementations, CAM 410 may be part of an external certificate authority located external to the CAS 132. A network interface 412 is also coupled to the processor 402 and to the network 114.

Figure 5:
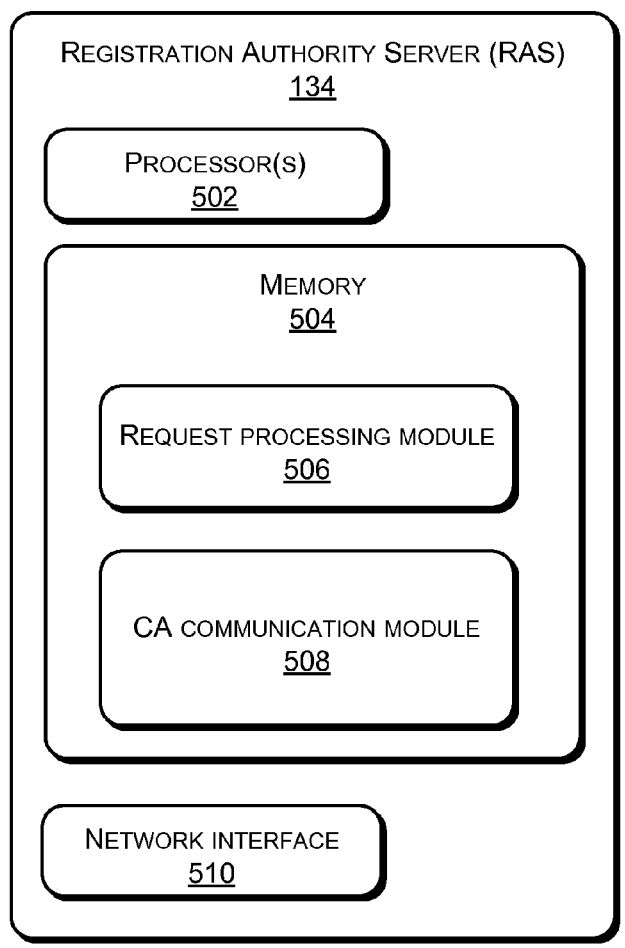
FIG. 5 is a schematic of an illustrative registration authority server (RAS) from FIG. 1.

FIG. 5 is a schematic 500 of an illustrative registration authority server (RAS) from FIG. 1. RAS 134 comprises one or more processors 502 and a memory 504 coupled to the processor(s) 502. Stored within memory 504 may be a request processing module 506. The request processing module 506 responds to certificate signing requests. Also stored within memory 504 may be a CA communication module configured to communicate with a certificate authority in the PM 130, such as CAS 132. A network interface 510 of the RAS 134 is also coupled to the processor 502 and to the network 114.

Figure 6:
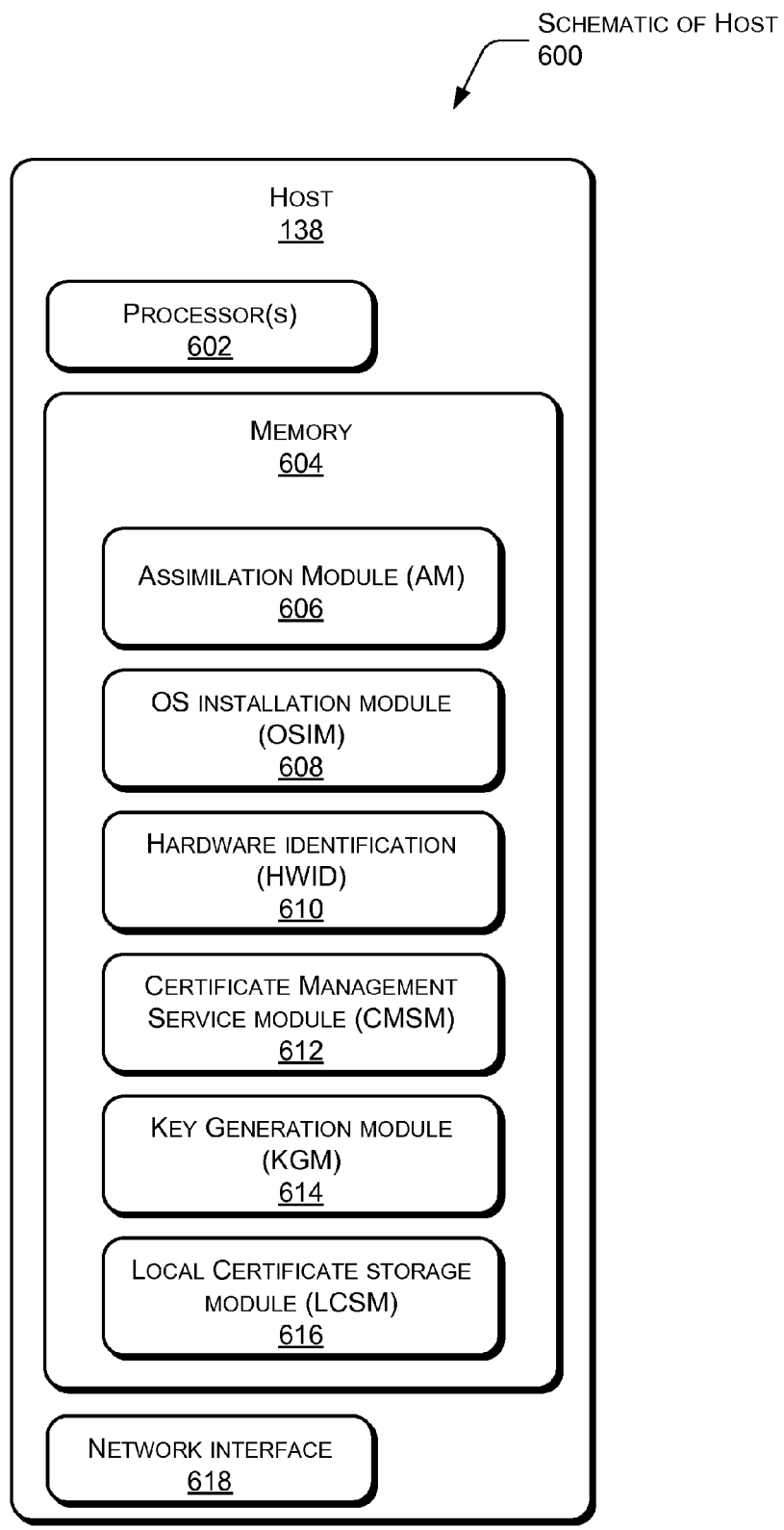
FIG. 6 is a schematic of the illustrative host from FIG. 1.

FIG. 6 is schematic 600 of the illustrative host 138 from FIG. 1. Host 138 comprises one or more processors 602 and a memory 604 coupled to the processor(s) 602. Stored in memory 604 may be an assimilation module (AM) 606 configured to seek out the BOS during initial power-on during provisioning and to retrieve a boot workflow. The boot workflow sets forth the sequence and nature of applications and utilities which are used during boot. Also within memory 604 may be an OS installation module (OSIM) 608 configured to execute the boot workflow, which in turn requests and installs an OS image on the host 138. A HWID 610 may be stored locally to the host 138.

A certificate management service module (CMSM) 612 is configured to request CSR's from TIS 126 or self-generate CSRs, send those CSRs to CAS 132, and receive, store, and control access to encryption certificates on the host 138. CMSM 612 may also provide application programming interfaces (APIs) to sign encryption certificates for other services on host 138.

A key generation module (KGM) 614 may be used to generate public-private key pairs for the CMSM 612.

A local certificate storage module (LCSM) 616 may handle the storage and retrieval of encryption certificates for the CMSM 612. The LCSM 616 may be stored securely in memory on the host 138 and, in some implementations, is accessible only by the service account used for the CMSM 612.

A network interface 618 is also coupled to the processor 602 and to the network 114.

Figure 7:
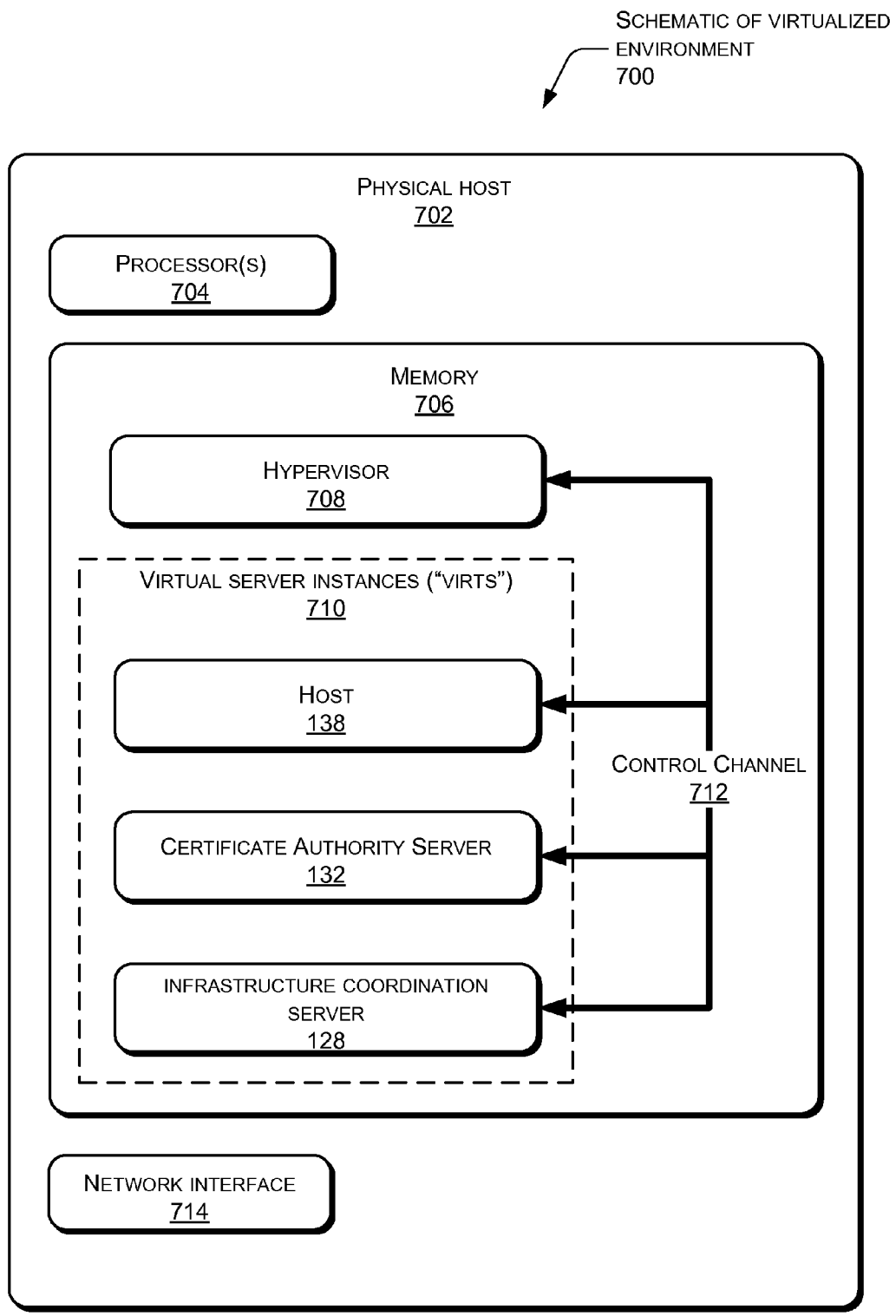
FIG. 7 is a schematic of an illustrative virtualized environment.

FIG. 7 is a schematic 700 of an illustrative virtualized environment. Physical server 702 comprises one or more processors 704 and a memory 706 coupled to the processor(s) 704.

Stored within memory 706 is hypervisor 708. A hypervisor may also be referred to as a virtual machine monitor (VMM) and provides an environment where multiple instances of operating systems may run concurrently on the same physical hardware.

Also within memory 706 are virtualized server instances (or "virts") 710. These virts 710 may include host 138, CAS 132, ICS 128 as shown, as well as other servers and components from the trusted agent(s) 116, PKI 130, and/or end entities 136. For example, in another implementation virts 710 may include host 138, RAS 134, and BOS 118.

Control channel 712 is shown between hypervisor 708 and the host 138, CAS 132, and ICS 128 virts 710. This control channel 712 remains within the memory of the same physical host 702, and thus may be considered highly trusted and secure. A network interface 714 may also be coupled to the processor 702 and to the network 114.

Illustrative Automated Provisioning

Figure 8:
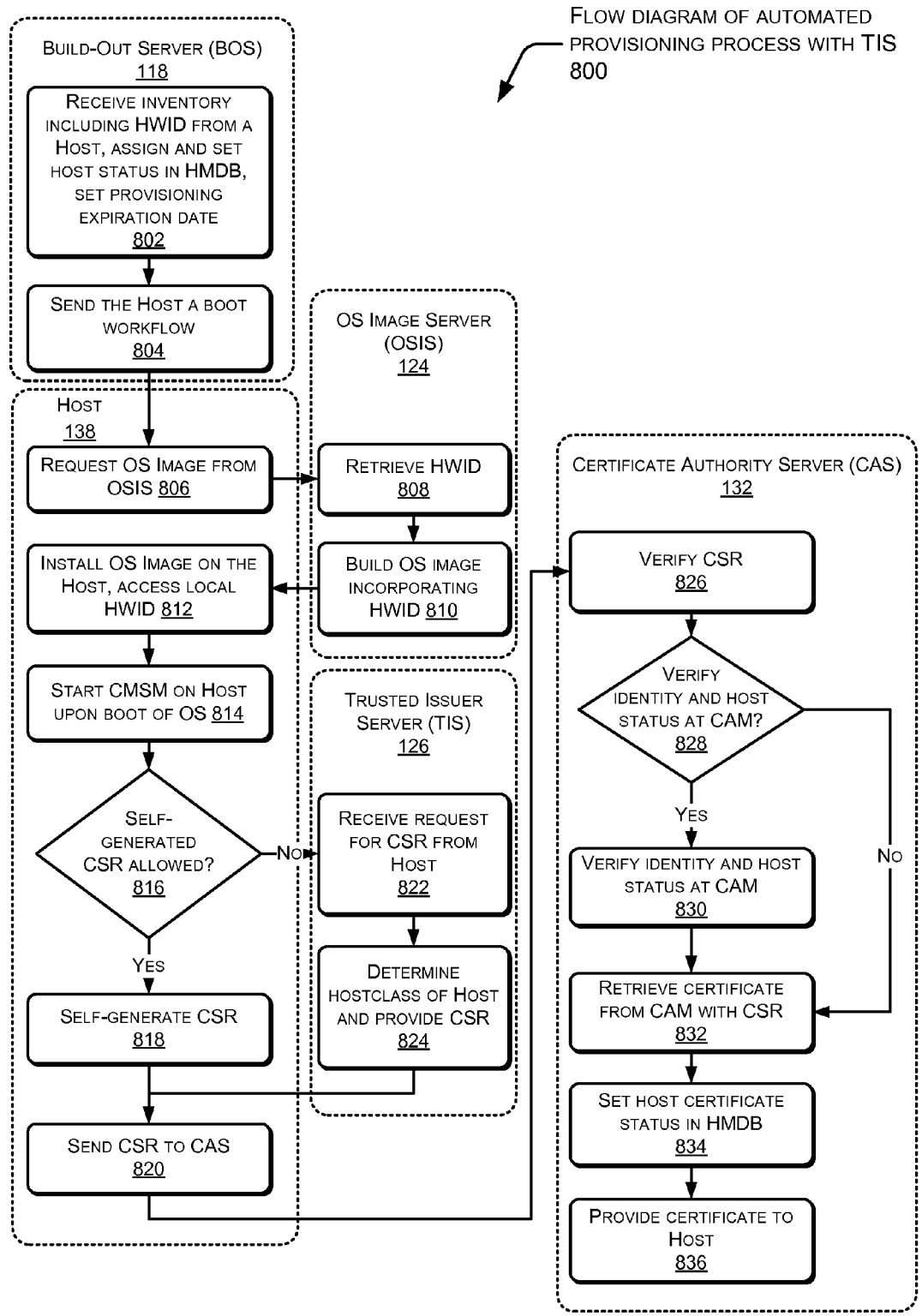
FIG. 8 is a flow diagram of an illustrative automated provisioning process with a TIS.

FIG. 8 is a flow diagram 800 of an illustrative automated provisioning process with a TIS. Broken lines indicate on what server the blocks of the process may take place in the implementation shown, however other implementations are possible.

At block 802, BOS 118 receives an inventory from host 138 after the host 138 initially powers up and executes assimilation module 606. At block 802, BOS 118 also updates HMDB 120 to set a host status indicating that assembly is in progress, to set a hardware identifier (HWID), and to set a provisioning expiration date. At block 804, BOS 118 sends the host 138 a boot workflow.

At block 806, host 138 processes the boot workflow and initiates the OSIM 608 which in turn requests an OS image from the OSIS 124. At block 808, OSIS 124 retrieves the HWID. At block 810, OSIS 124 builds an OS image which incorporates this HWID, and provides the OS image to host 138. At block 812, host 138 begins the installation of the OS image. When the installation has progressed sufficiently to allow local storage, at block 812 host 138 may access its local HWID and store the HWID 610.

For additional security, the OSIM 608 may close all network interfaces on the host during the deployment process at block 812 except for a control channel. This control channel permits communication with the BOS 118. Where the OSIM 608 and host 138 are virts on the same physical host 702, the control channel 712 between those virts may be considered highly secure.

At block 814, host 138 starts the CMSM 612 upon boot of the OS. At block 816, host 138 determines at the CMSM 612 when a self-generated CSR is permitted. Depending upon security policies for the network 114, CSRs may either be self-generated at host 138 or requested from the TIS 126. In a high security environment using virtualized server implementations, the TIS 126 may be a virtualized server instance controlling the physical hardware the virtualized host 138 is executing on. Thus, the communications between TIS 126 and host 138 which takes advantage of a control channel 712 between virts may be considered highly secure.

When, such as in high security environments, self-generated CSRs are not allowed at block 816, at block 822 the TIS 126 may receive a request for CSR from host 138. In one implementation, block 822 may be processed by CSRPM 206. In one implementation, CSRPM 206 may issue an alert if the HWID has previously been issued a CSR. As described above with respect to FIG. 1, where the TIS 126 and host 138 are separate virtualized instances executing on shared computing hardware, a high level of trust may be placed in data exchanged via a control channel between virtualized instances.

At block 824, TIS 126 may determine a hostclass of the host, and provides the CSR to host 138. This hostclass assigns the host 138 to a class permitted access to network resources.

When self-generated CSRs are allowed at block 816, at block 818 host 138 may self-generate a CSR. In one implementation, block 818 may be processed by CMSM 612 and KGM 138.

At block 820, host 138 sends the CSR to CAS 132. As described above with respect to FIG. 1, where the host 138 and CAS 132 are virtualized instances executing on shared computing hardware such as a single physical host, a high level of trust may be placed in data exchanged via a control channel between virtualized instances.

Block 826 on CAS 132 verifies the CSR, as described in more detail below in FIG. 9. In one implementation, block 826 may be processed by VSM 406.

For additional security on CAS 132, CAM 410 may require additional verification of host identity and status. When CAM 410 requires this additional verification at block 828, at block 830 CAM 410 verifies identity and host status. This additional verification is described in more detail below in FIG. 10.

At block 832, CAS 132 retrieves a signed encryption certificate from the CAM 410 with the CSR. At block 834, CAS 132 updates the HMDB 120 to indicate an encryption certificate has been issued to the HWID assigned to host 138, and sets a provisioning expiration date. At block 836, CAS 132 provides the encryption certificate to host 138. In one implementation, at block 836 CAS 132 may use a secure channel to further safeguard the encryption certificate. In other implementations, block 836 may actively send information to host 138, or wait for the host 138 to poll the CAS 132.

Figure 9:
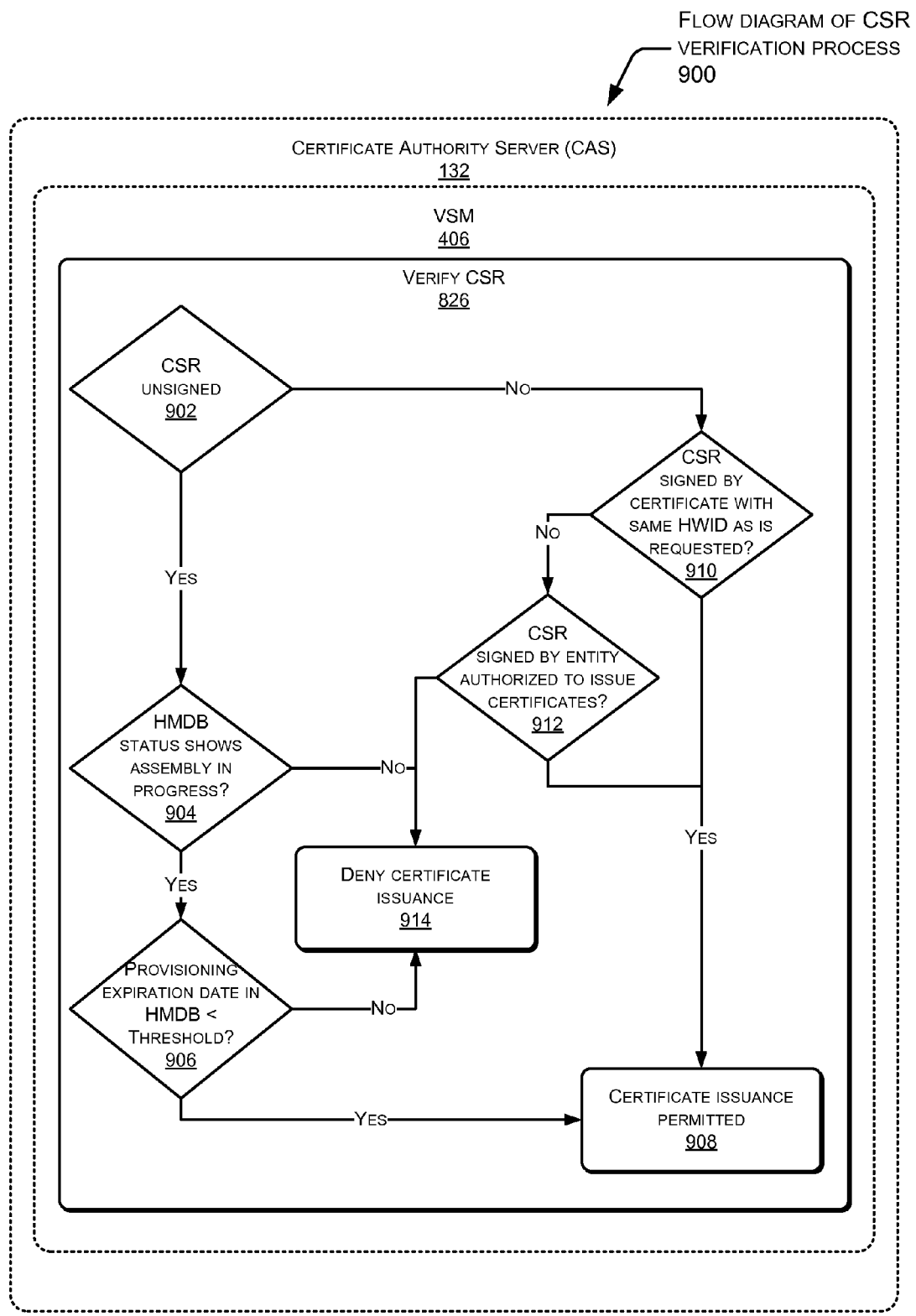
FIG. 9 is a flow diagram of an illustrative process of verifying a certificate signing request (CSR).

FIG. 9 is a flow diagram 900 of the illustrative process 826 of FIG. 8 of verifying a CSR. As indicated in this figure, the verify CSR 826 process may execute on CAS 132 within the VSM 406, however other implementations are possible. For example, CSR 826 may execute as a standalone module on CAS 132, or as a service on another server.

At block 902, VSM 406 determines if a CSR is unsigned. When VSM 406 determines that the host status in the HMDB 120 indicates assembly is in progress for the HWID referenced in the unsigned CSR at block 904, at block 906 VSM 406 determines if the provisioning expiration date in HMDB for this host is less than a threshold value. For example, the threshold may be set for eight hours, thus a CSR which is received within that eight hour window would be allowed. At block 904, VSM 406 thus determines if a host requesting a CSR is in fact one being provisioned, or if the host is a rogue. The HMDB 120 or other entity may update host status from indicating assembly is in progress to a "dead" or otherwise invalid status after a pre-determined length of time. This would prevent a host which has a stalled installation process from being exploited by a rogue host.

When VSM 406 at block 906 determines that the provisioning expiration date is less than a predetermined threshold, block 908 permits issuance of an encryption certificate.

When VSM 406 at block 902 determines a CSR is signed, if VSM 406 at block 910 determines a CSR is signed by a certificate with the same HWID as that being requested, at block 908 VSM 406 permits issuance of an encryption certificate.

When at block 910 VSM 406 determines a CSR is signed by a certificate with a different HWID as that being requested, at block 912 VSM 406 determines if the CSR is signed by an entity authorized to issue certificates. When VSM 406 at block 912 determines the CSR is signed by an entity authorized to issue certificates, at block 908 VSM 406 permits issuance of an encryption certificate.

Otherwise, if none of the foregoing conditions is met, permission to issue a certificate is denied by VSM 406 at block 914.

Figure 10:
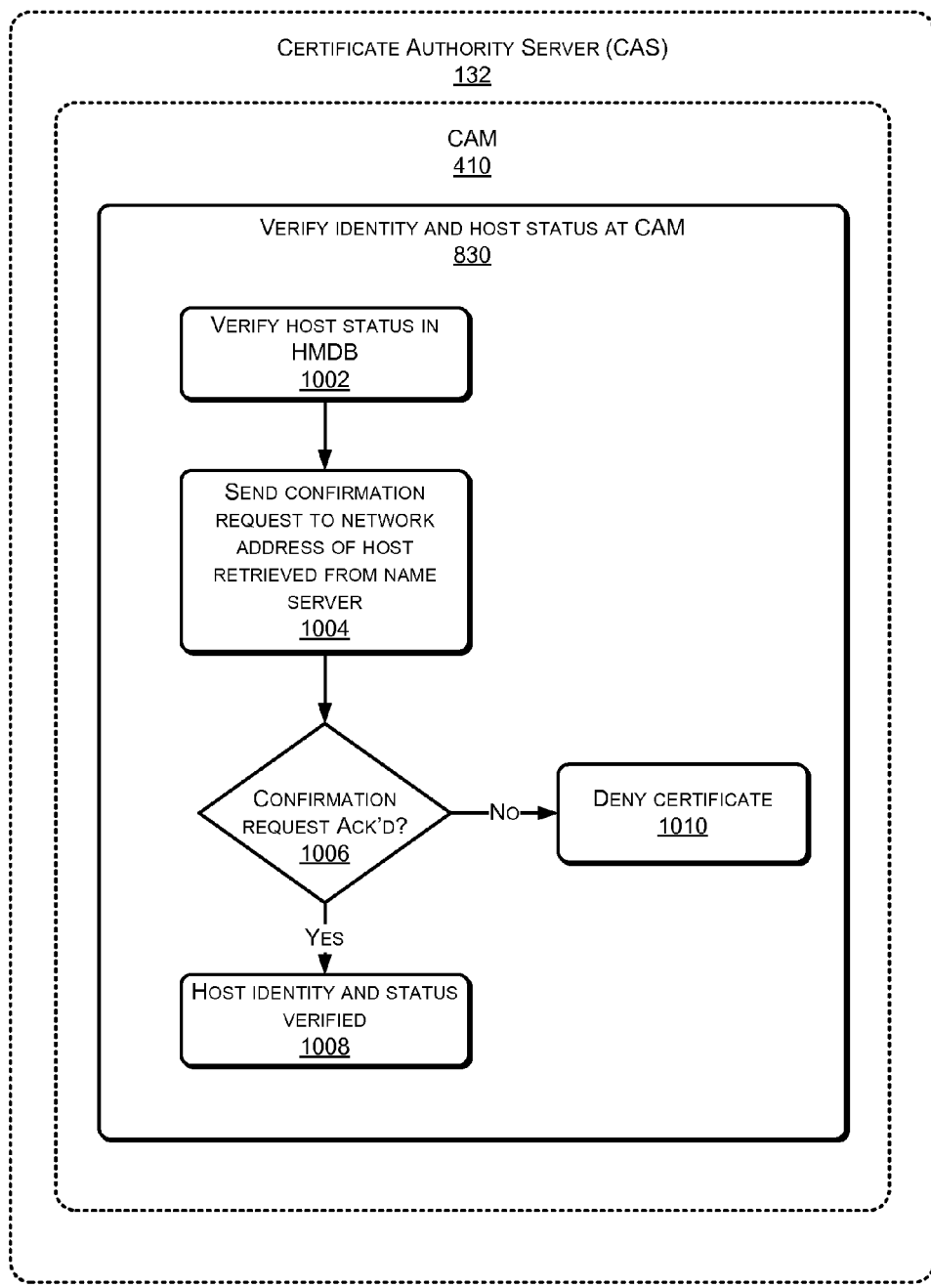
FIG. 10 is a flow diagram of an illustrative process of verifying identity and host status at a certificate authority module (CAM) of FIG. 8.

FIG. 10 is a flow diagram of an illustrative process 1000 of verifying identity and host status 830 at a CAM 410. As indicated in this figure, the process of verifying identity and host status at CAM 830 may execute on CAM 410, however other implementations are possible. For example, verification of identity and host status at CAM 410 may execute as a standalone module on CAS 132, or as a service on another server.

At block 1002, CAM 410 verifies that the host status in the HMDB 120 indicates a status of assembly in progress. At block 1004, CAM 410 resolves the network address (such as an IP address) of the host at a name server (such as a domain name server), and sends a confirmation request to this resolved network address. Instead of trusting the network address provided in the CSR request, the name is resolved in the name server to a network address listed for the host name indicated in the CSR request, and the confirmation is sent to the resolved network address. This provides an additional layer of verification. This additional layer of verification increases the level of complexity required for an attack or spoof.

Upon receipt of the confirmation request of block 1004, host 138 may respond by resending the CSR to the CAM 410. At block 1006 CAM 410 verifies that the original CSR and the re-sent CSR match. When CAM 410 at block 1006 indicates a match, at block 1008 CAM 410 indicates that the host identity and status has been verified, and the certificate process may proceed. When CAM 410 at block 1006 indicates no match, at block 1010 CAM 410 denies the CSR, thus denying issuance of an encryption certificate.

Figure 11:
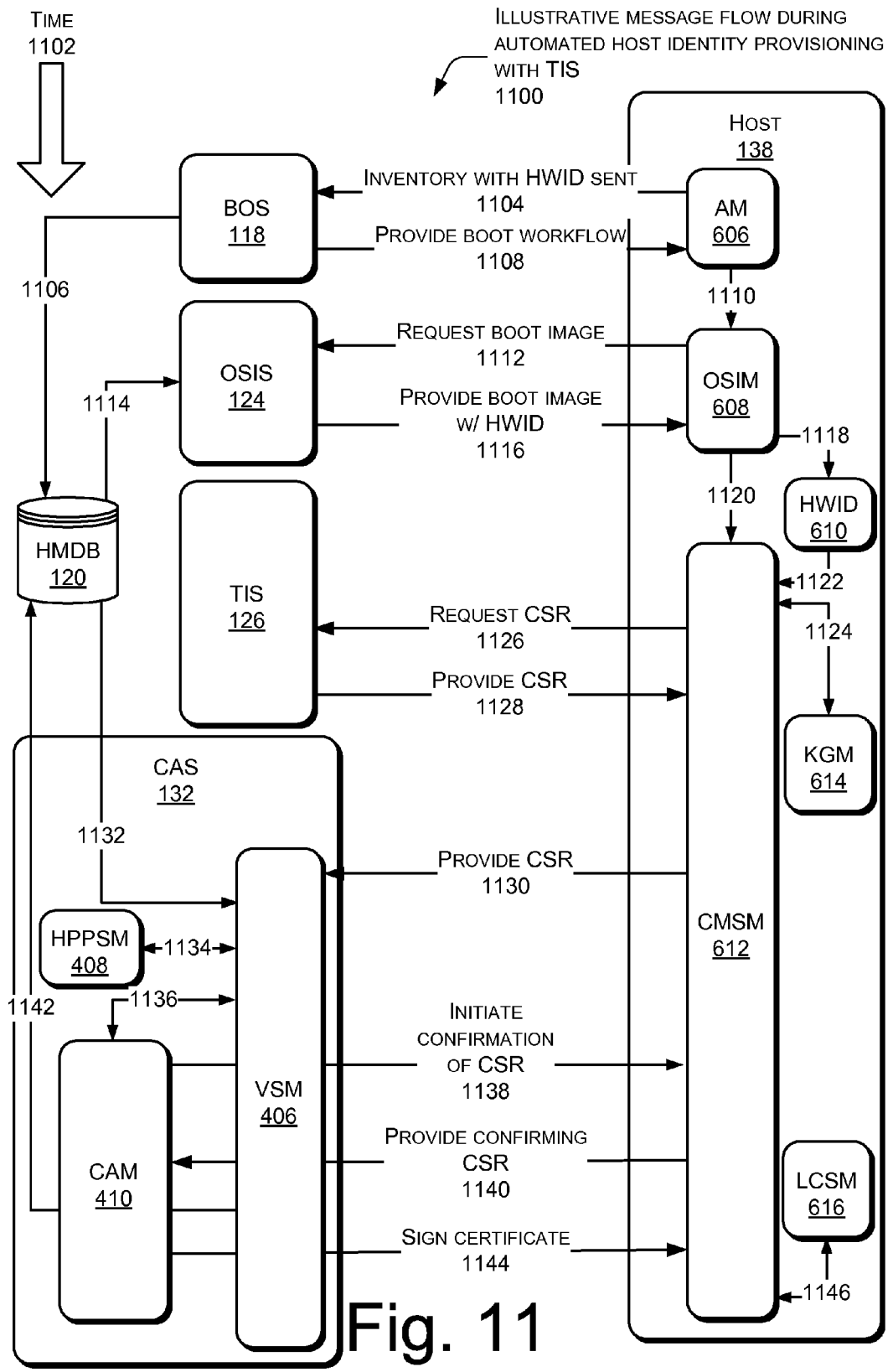
FIG. 11 is a flow diagram of an illustrative message flow during the automated provisioning process of FIG. 8 with a TIS.

FIG. 11 is a flow diagram of an illustrative message flow 1100 during the automated provisioning process 800 of FIG. 8. In this figure, time increases down the page, as indicated by arrow 1102.

At 1104, an inventory including HWID is sent from AM 606 on host 138 to BOS 118. At 1106, BOS 118 sets host status in the HMDB 120, and sets the certificate expiration date to null. At 1108, BOS 118 provides a boot workflow 1108 to AM 606 on host 138. At 1110, AM 606 passes the boot workflow to OSIM 608. At 1112, OSIM 608 requests a boot image from OSIS 124. At 1114, OSIS 124 retrieves 1114 the HWID from HMDB 120 and builds an OS image incorporating the HWID. At 1116, OSIS 124 provides the boot image with the HWID to OSIM 608. At 1118, OSIM 608 stores the HWID in HWID file 610 locally on host 138.

At 1120, OSIM 608 completes the OS boot and passes configuration data to CMSM 612. At 1122, HWID 610 may be provided to CSM 612. At 1124, KGM 614 may provide public-private key pairs to CMSM 612.

In one implementation, to realize greater security and utilize the trusted channel 712 between virts, when self-generation of a CSR is not permitted by the configuration provided to the host as part of the boot workflow, at 1126, CMSM 612 requests a CSR from TIS 126. At 1128, in response to 1126, TIS 126 provides a CSR to CMSM 612. As described above with respect to FIG. 1, where the TIS 126 and host 138 are separate virtualized instances executing on shared computing hardware, a high level of trust may be placed on the CSR data exchanged via a control channel between virtualized instances.

At 1130, CMSM 612 provides the CSR to VSM 406. At 1132, VSM 406 retrieves host information as described above, such as HWID, host status, and certificate expiration date. At 1134, HPPSM 408 provides information for verifying that BOS 118 has authority to issue a CSR for the requested hostclass. At 1136, the verified CSR is passed to CAM 410.

When confirmation at the CAM 410 is desired, as discussed with reference to FIG. 10 above, at 1138 a confirmation of CSR is initiated to CMSM 612. At 1140, CMSM 612 provides the confirming CSR to CAM 410 which issues an encryption certificate. At 1142, VSM 406 updates the HMDB 120 to reflect that an encryption certificate has been issued, and to include the expiration date of the encryption certificate, host status, etc. At 1144, the issued encryption certificate is provided to CMSM 612. As described above with respect to FIG. 1, where the CAS 132 and host 138 are virtualized on shared computing hardware, data exchanged via a control channel between virtualized instances may be accorded a high level of trust. At 1146, the CMSM 612 stores the encryption certificate in the LCSM for later use.

Automated Provisioning with ICS

Figure 12:
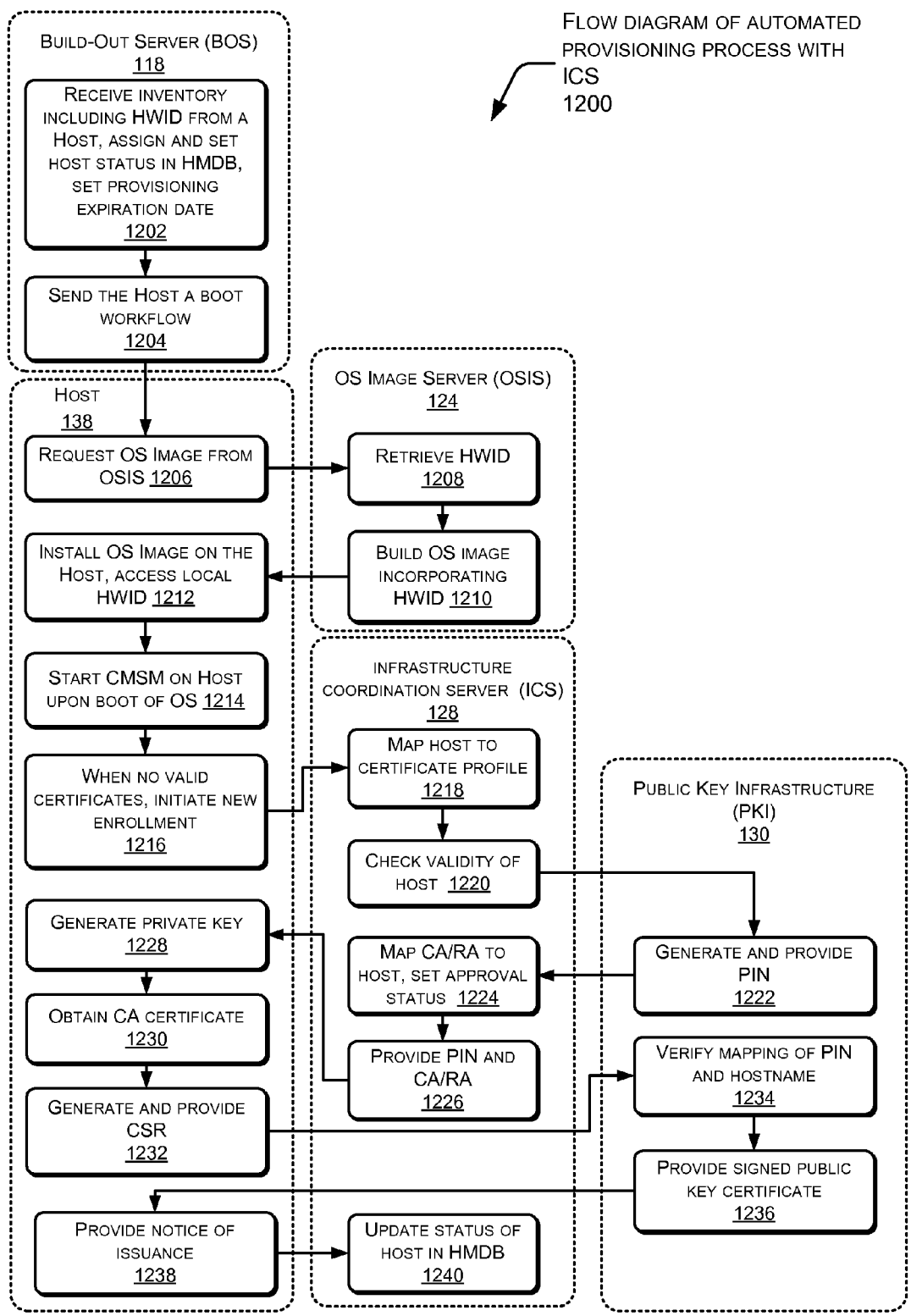
FIG. 12 is a flow diagram of an illustrative automated provisioning process with an ICS.

An alternative to the automated provisioning described above which includes a TIS 126 is possible. In this alternative ICS 128 acts as an intermediate management step between trusted agents 116, PKI 130, and end entities 136. FIG. 12 is a flow diagram of an illustrative automated provisioning process with an ICS 128. Broken lines indicate on what server the blocks of the process may take place in the implementation shown, however other implementations are possible.

At block 1202, BOS 118 receives an inventory from host 138 after the host 138 initially powers up and executes an assimilation module 606. At block 1202, BOS 118 also updates HMDB 120 to set a host status indicating that assembly is in progress, to set a hardware identifier (HWID), and to set a provisioning expiration date. At block 1204, BOS 118 sends the host 138 a boot workflow.

At block 1206, host 138 processes the boot workflow and initiates the OSIM 608 which in turn requests an OS image from the OSIS 124. At block 1208, OSIS 124 retrieves the HWID from the HMDB 120. At block 1210, OSIS 124 builds an OS image which incorporates this HWID, and provides the OS image to host 138. At block 1212, host 138 begins the installation of the OS image. When the installation has progressed sufficiently to allow local storage, at block 812 host 138 may access and store the HWID 610 locally in a file.

For additional security, the OSIM 608 may close all network interfaces on the host during the deployment process at block 1212 except for a control channel. This control channel permits communication with the BOS 118. Where the OSIM 608 and host 138 are virts on the same physical host 702, the control channel 712 between those virts may be considered highly secure.

Similar to FIG. 8 above, where high security is called for, a host may be disallowed from self-generating a CSR. In such a high security environment using virtualized server implementations, host 138 may request a CSR from a trusted agent 116 which is a virtualized instance on the same physical hardware the virtualized host 138 is executing on. Thus, the communications host 138 and trusted agent 116 would use control channel 712 between virts and be considered highly secure.

At block 1214, host 138 starts the CMSM 612 upon boot of the OS. At block 1216, when the CMSM 612 on host 138 determines no valid certificates are available, a new certificate enrollment process may be initiated.

At block 1218, ICS 128 receives an enrollment request from host 138, and maps the host 138 to a certificate profile. The certificate profile describes what certificate types are available to a host, as certificate status such as what certificates have been issued, pending, or revoked.

At block 1220, ICS 128 checks validity of the host 138 to determine if the status of host 138 indicates an enrollment is in progress and the request is within the provisioning expiration date. This is in contrast to the process of FIG. 8 where a CAS 132 performs the verification. When host 138 is valid, block 1220 requests a PIN from PKI 130.

At block 1222, PKI 130 generates and provides a "PIN" to ICS 128, for use by host 138. This PIN comprises a one-time password, and may be valid for a specified period of time. Use of a PIN provides increased security because it is specifically generated for a given host and may contain a built-in expiration date. Within PKI 130, as described above, the PIN request may be processed by a CAS 132, a RAS 134, or other PKI component.

At block 1224, ICS 128 maps a certificate authority (CA) or registration authority (RA) to host 138 and sets status in HMDB 120 indicating the new enrollment request and PIN is approved. This mapping may include multiple possible CA's or RA's to provide for redundancy in the event of a CA or RA failure. At block 1226, ICS 128 provides the PIN and CA/RA information to host 138.

At block 1228, host 138 generates a private key. At block 1230, host 138 uses the private key and the CA/RA information received from ICS 128 to obtain a certificate from a CA, such as CAS 132. Once obtained, at block 1232 host 138 may generate and provide a CSR to PKI 130.

At block 1234, PKI 130 verifies the mapping of the PIN and hostname to confirm validity of the CSR provided by host 138. When valid, at block 1236 PKI 130 provides a signed public key certificate to host 138.

At block 1238, host 138 stores the signed public key certificate provided by PKI 130, and provides a notice of issuance to ICS 128. At block 1240, ICS 128 updates status of the host in HMDB 120 to indicate enrollment of host 138 is complete.

Figure 13:
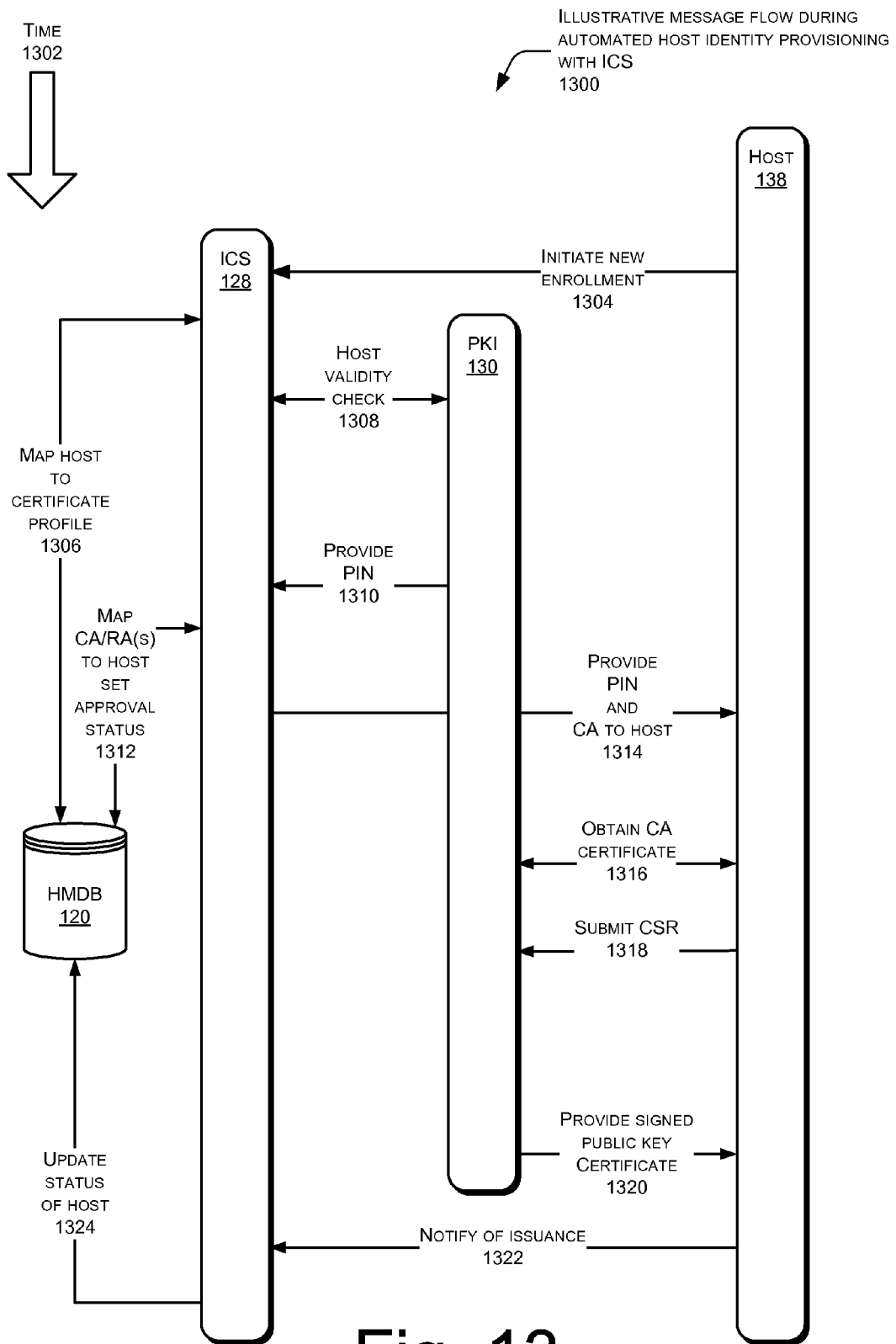
FIG. 13 is a flow diagram of an illustrative message flow during the automated provisioning process of FIG. 12 with an ICS.

FIG. 13 is a flow diagram of an illustrative message flow 1300 during the automated provisioning process 1200 of FIG. 12 with an ICS. For clarity, the internal modules of ICS 128, PKI 130, and host 138 are not depicted. In this figure, time increases down the page, as indicated by arrow 1302.

At 1304 host 138 initiates a new enrollment process with ICS 128. At 1306, ICS 128 maps the host to certificate profile in HMDB 120. At 1308 ICS 128 checks host validity with PKI 130. When the host is valid, at 1310 PKI 130 provides a PIN to ICS 128. At 1312, ICS 128 maps CA/RA(s) to host 138, and sets approval status within HMDB 120. At 1314, ICS 128 provides PIN and CA/RA information to host 138. At 1316, host 138 obtains a CA certificate from PKI 130. At 1318, host 138 submits a CSR signed with the obtained CA certificate to PKI 130. At 1320, PKI 130 may determine when the CSR is valid and provide a signed public key certificate to host 138. At 1322, host 138 notifies ICS 128 of issuance of a signed certificate. At 1324, ICS 128 updates status of the host in HMDB 120 to indicate enrollment is complete.

Renewal of Certificates with TIS

Once the initial encryption certificate has been issued, the host 138 may need to revoke an existing certificate and be issued a new certificate. This renewal process is now described.

Figure 14:
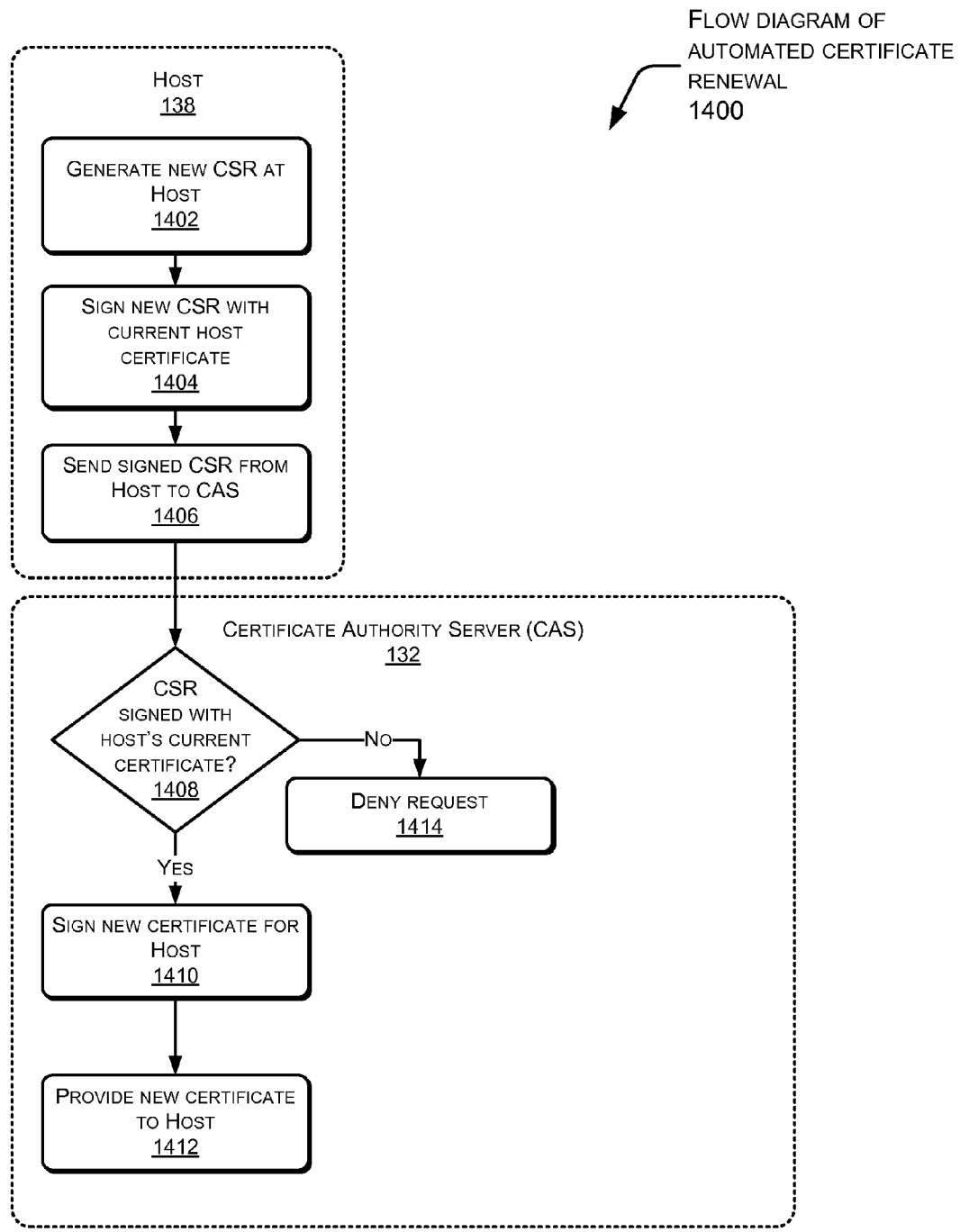
FIG. 14 is a flow diagram of an illustrative automated certificate renewal process.

FIG. 14 is a flow diagram 1400 of an illustrative automated certificate renewal process. Broken lines indicate on what server the blocks of the process may take place in the implementation shown, however other implementations are possible. For example, verification of CSRs and/or the sending of a new certificate to a host may take place on a different server.

At block 1402, host 138 generates a new CSR at the host. At block 1404, host 138 signs the new CSR with the current host encryption certificate. At block 1406, host 138 sends the signed CSR to CAS 132.

At block 1408, CAS 132 determines if the CSR is signed with host 138's current certificate. When the CSR is signed with the current certificate for host 138, at block 1410 CAS 132 signs a new certificate for host 138. At block 1412, CAS 132 sends the new certificate to host 138. When CAS 132 at block 1408 determines that a CSR is not signed with host 138's current certificate, at block 1414, CAS 132 denies the request and may also log the incident and issue an alert for follow up by an administrator. This process helps to tightly control the number of valid encryption certificates which are available at any given time. Any of the processes described in this application may be configured to provide notification to a system administrator should they become interrupted or result in an error state.

Figure 15:
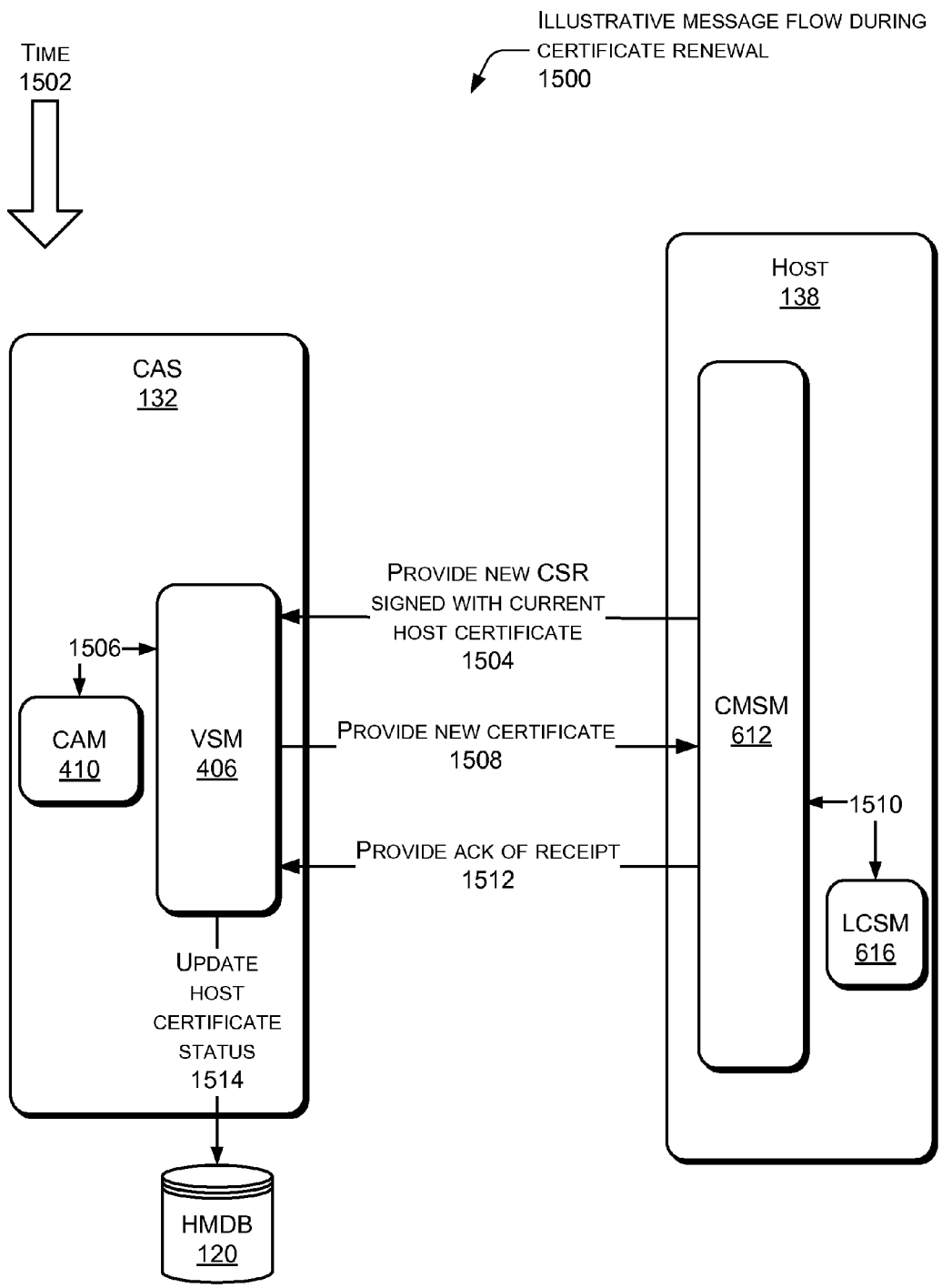
FIG. 15 is a flow diagram of an illustrative message flow during the automated certificate renewal process of FIG. 14.

FIG. 15 is flow diagram 1500 of an illustrative message flow during the automated certificate renewal process 1400 of FIG. 14. As with FIG. 13, time increases down the page, as indicated by arrow 1502.

At 1504, CMSM 612 provides a new CSR signed with the current host certificate to VSM 406 on CAS 132. At 1006, VSM 406 verifies the CSR and passes the CSR to CAM 410 for issuance of an encryption certificate. Verification of identity and host status at CAM as described above in FIG. 10 may also take place.

At 1508, following issuance by CAM 410, VSM 406 provides a new certificate to CMSM 612. At 1510, CMSM 612 stores the new certificate in LCSM 616 and may revoke the current certificate. At 1512, CMSM 612 may provide an acknowledgement of receipt of the new certificate to VSM 406. At 1514, VSM 406 then updates the host certificate status in HMDB 120, and may revoke or allow the current certificate to expire.

Renewal of Certificates with ICS

Figure 16:
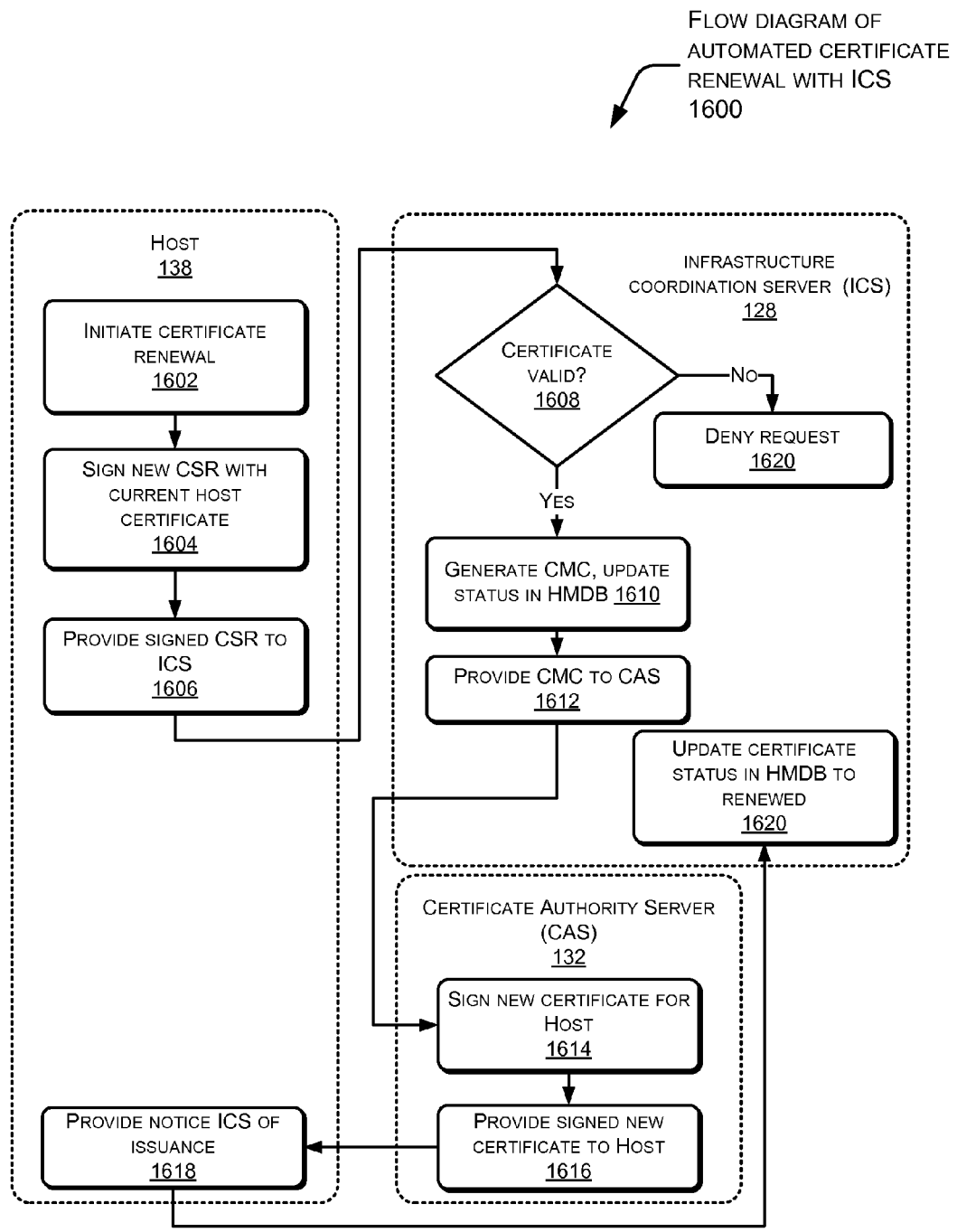
FIG. 16 is a flow diagram of an illustrative automated certificate renewal process with ICS.

As described above, once an initial encryption certificate has been issued, the host 138 may need to renew a certificate. FIG. 16 is a flow diagram of an alternative illustrative automated certificate renewal process 1600 with ICS. Broken lines indicate on what server the blocks of the process may take place in the implementation shown, however other implementations are possible.

At block 1602, host 138 initiates a certificate renewal. At block 1604, host 138 signs a new CSR with the current host certificate. At block 1606, host 138 provides the signed CSR to ICS 128.

At block 1608, ICS 128 determines if the host certificate used to sign the CSR from host 138 is valid. When the certificate is valid, at block 1610 the ICS 128 may generate a Certificate Management over Cryptographic Message Syntax (CMC) message as defined by the Internet Engineering Task Force Request for Comments 5272 and 5273, and update the status in HMDB 120 to indicate that renewal is in progress.

At block 1614, CAS 132 processes the CMC and may sign new certificate for host 138. At block 1616, CAS 132 provides the signed new certificate to host 138. At block 1618, host 138 provides a notice of issuance of certificate to ICS 128. At block 1620, ICS 128 updates the certificate status in HMDB 120 to indicate the certificate has been successfully renewed.

Figure 17:
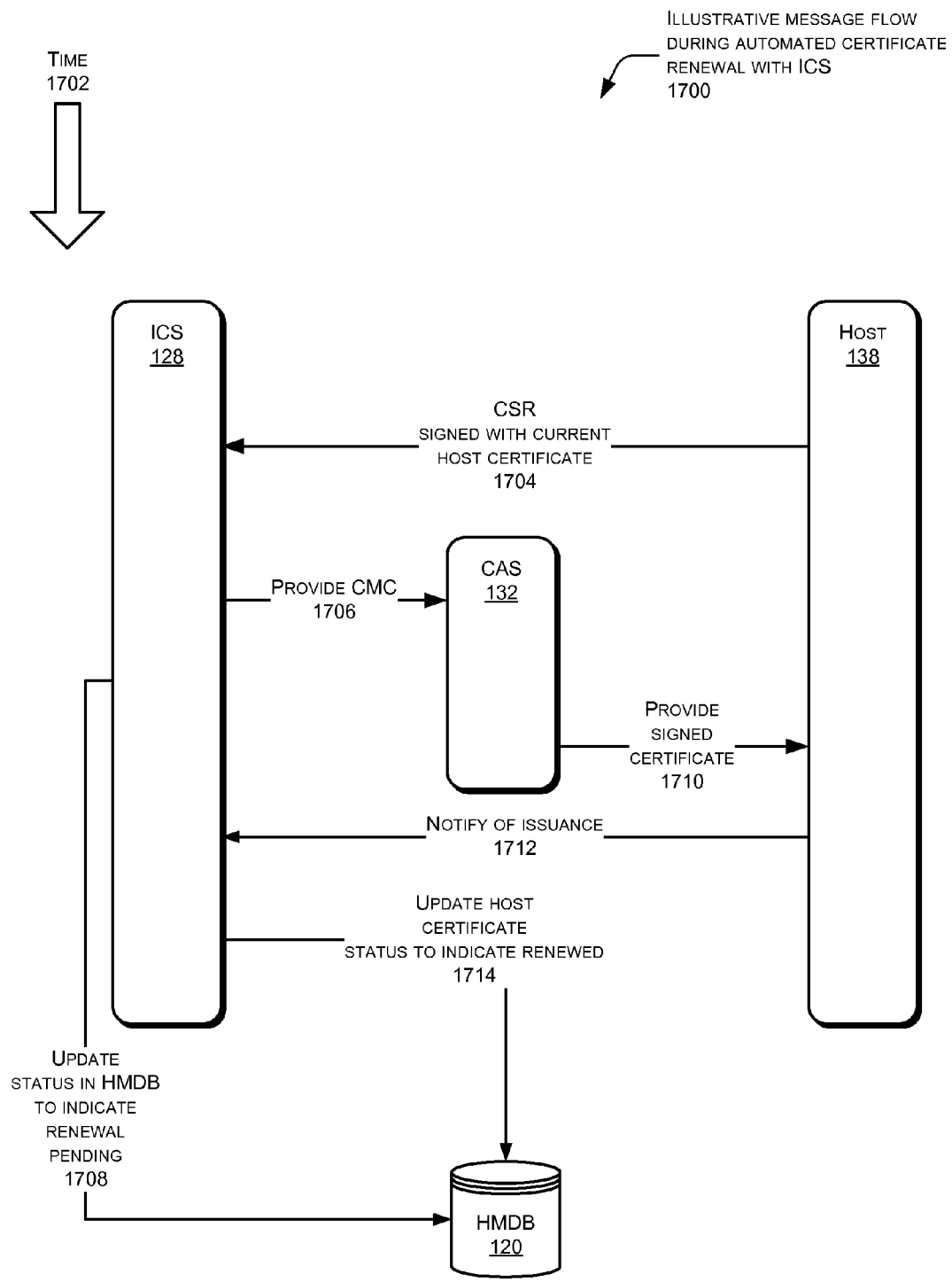
FIG. 17 is a flow diagram of an illustrative message flow during the automated certificate renewal process with ICS of FIG. 16.

FIG. 17 is a flow diagram of an illustrative message flow 1700 during the automated certificate renewal process with ICS 1600 of FIG. 16. As with FIG. 15, time increases down the page, as indicated by arrow 1702. For clarity, the internal modules of ICS 128, CAS 132, and host 138 are not depicted.

At 1704, host 138 sends a CSR signed with current host certificate to ICS 128. At 1706, ICS 128 provides a CMC to CAS 132. At 1708, ICS 128 updates status in HMDB 120 to indicate renewal of certificate is pending. At 1710, upon validation of CSR, CAS 132 provides a signed certificate to host 138. At 1712, host 138 notifies ICS 128 of successful certificate issuance. At 1714, ICS 128 updates host certificate status to indicate renewal is complete.

Automated Certificate Revocation Process

It is occasionally necessary to revoke or invalidate an existing certificate. Revocation of a certificate may be initiated by decommissioning, security policies, security breach, etc. After revocation, a certificate is no longer valid.

Figure 18:
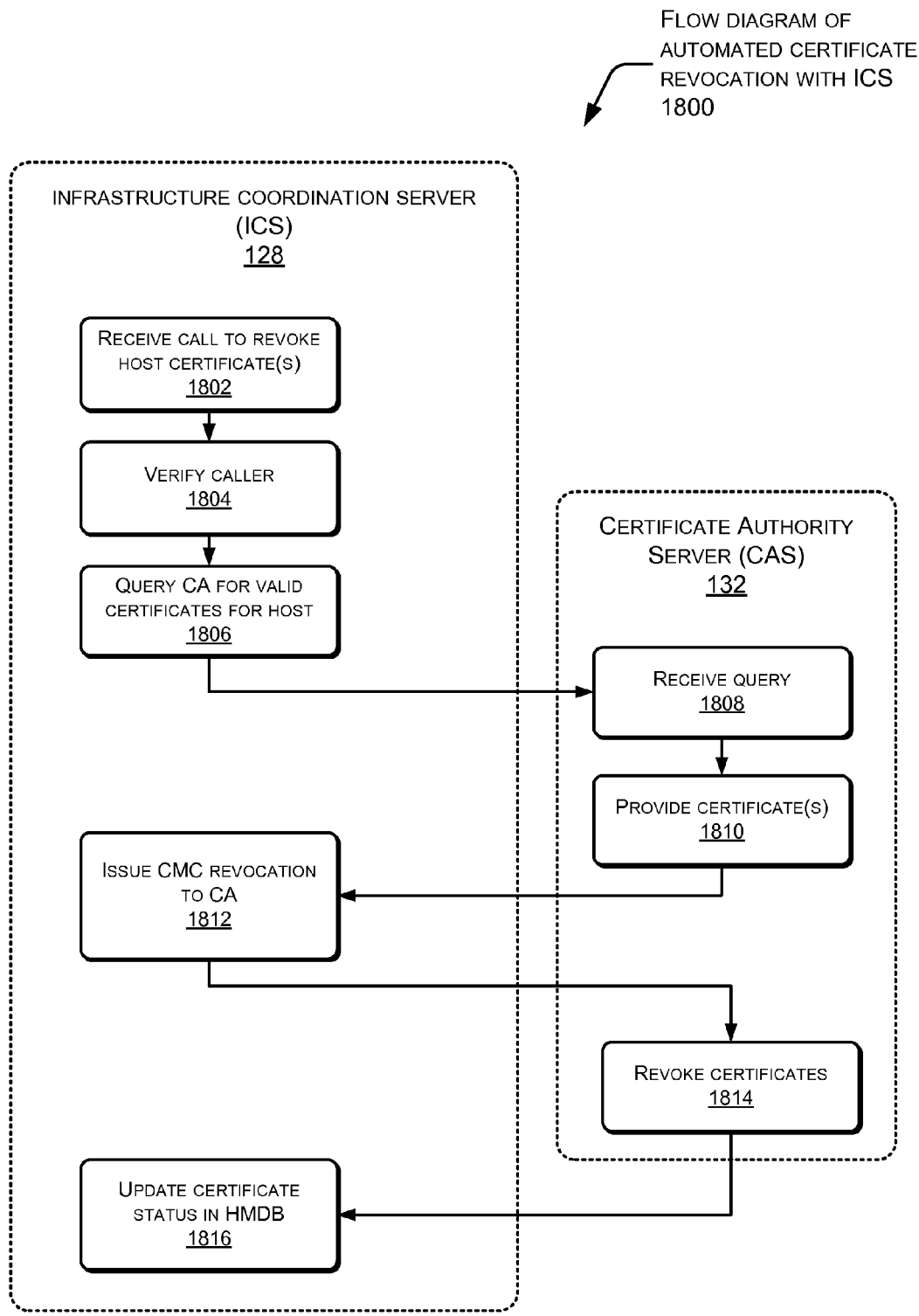
FIG. 18 is a flow diagram of an illustrative automated certificate revocation with ICS.

FIG. 18 is a flow diagram of an illustrative automated certificate revocation process with ICS 1800. Broken lines indicate on what server the blocks of the process may take place in the implementation shown, however other implementations are possible.

At block 1802, ICS 128 receives a call to revoke one or more host certificates held by a host. At 1804, ICS 128 may verify the caller. When the call is verified, at block 1806 ICS 128 may query a certificate authority for valid certificates mapped to the host.

At block 1808, CAS 132 may receive and process the query. At block 1810, CAS 132 provides the certificates resulting from the query to ICS 128. At block 1812, ICS 128 may issue a CMC revocation to the certificate authority. At block 1814, CAS 132 (the certificate authority in this figure) acts on the CMC revocation and revokes the certificates. At block 1816, ICS 128 updates the certificate status for the host in HMDB 120.

Figure 19:
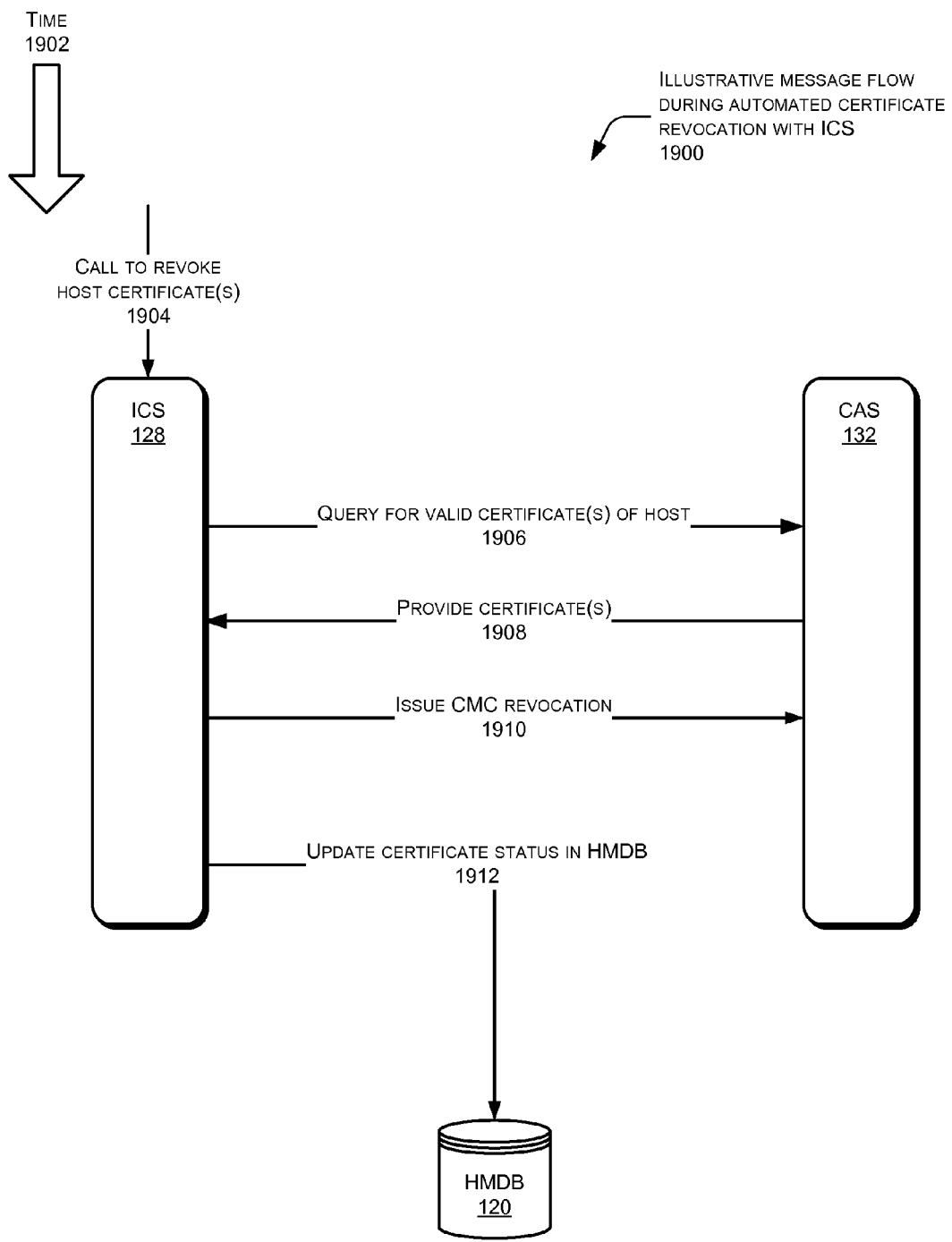
FIG. 19 is a flow diagram of an illustrative message flow during the automated certificate revocation process with ICS of FIG. 18.

FIG. 19 is a flow diagram of an illustrative message flow 1900 during the automated certificate revocation process with ICS 1800 of FIG. 18. As with FIG. 17, time increases down the page, as indicated by arrow 1902.

At 1904 the call to revoke a host certificate is presented to ICS 128. When the call is validated, at 1906 ICS 128 queries the CAS 132 for valid certificates assigned to the host. At 1908, CAS 132 provides the certificates to ICS 128. At 1910, ICS 128 issues a CMC revocation to CAS 132. At 1912, ICS 128 updates the certificate status in HMDB 120 to indicate the certificates have been revoked.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Furthermore, while this application has been discussed in the context of certificate authentication, other implementations are possible. For example, Kerberos or other computer network authentication protocols may be utilized instead of or in addition to certificate authentication.

What is claimed is:

1. One or more non-transitory computer-readable storage media storing instructions that when executed instruct a processor of an infrastructure coordination server to perform acts comprising:

receiving an enrollment request from a host;
mapping the host to a certificate profile;
determining a validity of a host identity associated with the host;
obtaining, without human intervention, a personal identification number (PIN) from a public key infrastructure (PKI);
mapping multiple certificate authorities (CAs) to the host to accommodate for a failure of at least one of the multiple CAs;
providing, without human intervention, the PIN and CA connection information to the host;
signing an encryption certificate using a private key;
issuing the signed encryption certificate to the host;
sending, to the host, a new certificate;
revoking the signed encryption certificate; and
renewing the new certificate.

2. The one or more non-transitory computer-readable storage media of claim 1, wherein the PKI comprises a certificate authority, a registration authority, or both.

3. The one or more non-transitory computer-readable storage media of claim 1, wherein the certificate profile identifies one or more types of certificates that are available to the host.

4. The one or more non-transitory computer-readable storage media of claim 1, wherein the certificate profile identifies a certificate status for one or more certificates, the certificate status indicating whether the one or more certificates are at least one of issued, pending or revoked.

5. The one or more non-transitory computer-readable storage media of claim 1, wherein the validity of the host identity is determined to identify a status of the host, the status of the host indicating whether an enrollment is in progress and whether the enrollment request is prior to an expiration date.

6. The one or more non-transitory computer-readable storage media of claim 1, wherein the PIN is a one-time password that is valid for a predetermined period of time.

7. The one or more non-transitory computer-readable storage media of claim 1, wherein the acts further comprise:
generating a private key that is provided to the host; and
issuing the signed encryption certificate to the host as a result of validating the private key, the PIN, and the CA connection information.

8. A method comprising:
under control of one or more computing devices having computer-executable instructions:
receiving an enrollment request from a host;
mapping the host to a certificate profile, the certificate profile identifying one or more types of certificates that are available to the host;
determining a validity of a host identity associated with the host;
obtaining, without human intervention, a personal identification number (PIN) from a public key infrastructure (PKI) based at least partly on determining the validity of the host identity;
mapping multiple certificate authorities (CAs) to the host to accommodate for a failure of at least one of the multiple CAs;
providing, without human intervention, the PIN and CA connection information to the host;
signing an encryption certificate using a private key;
issuing the signed encryption certificate to the host based at least in part on the PIN and the CA connection information;
sending, to the host, a new certificate;
revoking the certificate; and
renewing the new certificate.

9. The method of claim 8, wherein the enrollment request is received at least partly in response to a determination that no valid certificates are available to the host.

10. The method of claim 8, wherein the certificate profile further identifies a certificate status for a plurality of certificates, the certificate status indicating whether the plurality of certificates are at least one of issued, pending or revoked.

11. The method of claim 8, wherein the validity of the host identity is determined to identify a status of the host, the status of the host indicating whether an enrollment is in progress or whether the enrollment request is within an expiration date.

12. The method claim 8, wherein the PIN is a one-time password that is valid for a predetermined period of time and is generated specifically for the host.

13. The method of claim 8, further comprising:
generating a private key that is provided to the host; and
issuing the certificate to the host based at least in part on the private key.

14. A method comprising:
under control of one or more computing devices having computer-executable instructions:
receiving an enrollment request from a host;
determining a validity of a host identity associated with the host;
obtaining, without human intervention, a personal identification number (PIN) from a public key infrastructure (PKI), as a result of, determining the validity of the host identity;
mapping multiple certificate authorities (CAs) to the host to accommodate for a failure of at least one of the multiple CAs;
providing, without human intervention, the PIN and CA connection information to the host, the CA connection information being associated with at least one of the multiple CAs;
signing an encryption certificate using a private key;
issuing the signed encryption certificate to the host based at least in part on validating the PIN and the CA connection information received from the host;
sending, to the host, a new certificate;
revoking the certificate; and
renewing the new certificate.

15. The method of claim 14, wherein the PKI comprises a certificate authority, a registration authority, or both.

16. The method of claim 14, wherein the enrollment request is received at least partly in response to a determination that no valid certificates are available to the host.

17. The method of claim 14, further comprising mapping the host to a certificate profile that identifies one or more types of certificates that are available to the host.

18. The method of claim 17, wherein the certificate profile further identifies a certificate status for one or more certificates, the certificate status indicating whether the one or more certificates are at least one of issued, pending or revoked.

19. The method of claim 14, wherein the validity of the host identity is determined to identify a status of the host, the status of the host indicating whether an enrollment is in progress or whether the enrollment request is within an expiration date.

20. The method of claim 14, further comprising:
generating a private key that is provided to the host; and
issuing the certificate to the host based at least in part on the private key.

21. The method of claim 14, wherein the PIN is a one-time password validate for an interval of time.

\* \* \* \* \*